2,886,407

TREATMENT OF PLUTONIUM SOLUTION WITH NO OR NO$_2$ PRIOR TO REMOVAL OF TETRAVALENT PLUTONIUM FROM SAID SOLUTION BY CARRIER PRECIPITATION

George E. Moore, Oak Ridge, Tenn., assignor to the United States of America as represented by the United States Atomic Energy Commission.

No Drawing. Application February 19, 1945
Serial No. 578,793

8 Claims. (Cl. 23—14.5)

The present invention relates to a method for the recovery of plutonium from dilute solutions thereof. More particularly, it is concerned with a process for the recovery of plutonium contained in solutions prepared by dissolving neutron irradiated uranium in nitric acid or for the treatment of solutions generally in which the plutonium is in the hexavalent state.

The element plutonium is produced as one of the products resulting from the irradiation of uranium metal with neutrons. Naturally occurring uranium consists chiefly of three isotopes, namely, $U^{234}$, $U^{235}$, and $U^{238}$, the latter being present in excess of 99% of the whole. When $U^{238}$ is subjected to the action of slow or thermal neutrons, a fourth isotope, $U^{239}$, is produced having a half life of 23 minutes and undergoes beta decay to $Np^{239}$, now known as neptunium. The latter element possesses a half life of 2.3 days and by beta decay is converted into $Pu^{239}$, or plutonium. In addition to the formation of the transuranic elements, neptunium and plutonium, there are simultaneously produced other elements of lower atomic weights, known as fission fragments. These fragments are composed of two distinct element groups, i.e., a light and heavy element group. The light group contains elements having atomic numbers of between about 34 and 46 while the heavier group is composed of elements of atomic numbers varying between about 51 and 60. The elements of these groups as originally produced are for the most part highly overmassed and undercharged and, hence, are highly unstable. By beta radiation in many cases, however, they quickly transform themselves into isotopes of these various elements, many of which have longer half lives. The resulting decay products of these fission fragments are commonly known as fission products. These fission products comprise isotopes of various elements having atomic numbers from about 34 to 64.

Plutonium can be recovered from neutron irradiated uranium metal in accordance with several procedures. The most common of which involves first dissolving the metal in nitric acid to form a solution of uranyl nitrate. The solution is then preferably subjected to reducing conditions in order to reduce any plutonium which is in the hexavalent state to a valence of 4 in which state it is carriable. A suitable carrier, such as for example, bismuth phosphate or lanthanum fluoride is then added and the plutonium removed from solution together with some fission products. The precipitate thus obtained is next dissolved in concentrated nitric acid and the resulting solution subjected to oxidation, thereby converting the plutonium present therein to the hexavalent state in which condition it is not removed from solution by carriers. Application of carriers to such solutions, however, does remove the fission products contained therein and thus further separation of plutonium from the impurities normally associated therewith is effected. This procedure can be repeated until the desired plutonium concentration is reached. Further operational details in regard to the manner in which the foregoing oxidation-reduction cycles can be effected are described in copending application U.S. Ser. No. 519,714, filed January 26, 1944, now U.S. Patent No. 2,785,951, by Glenn T. Seaborg et al.

In addition to the fact that plutonium in its higher valent state is not carriable as such by carriers of the type of lanthanum fluoride but must be reduced to a valence of 4, it has further been found that in plutonium-containing solutions prepared by dissolving neutron irradiated uranium in nitric acid, the plutonium is at least partially converted to a non-carriable state apparently by the presence of some intermediate reduction product or products, produced by the reduction of nitric acid, such as for example hydrazine, during the solution of uranium, which tends to form a soluble complex therewith. While not all of the plutonium is affected in this manner, a rather sizable portion of it is rendered non-carriable, and since that element constitutes only a relatively small portion of the dissolved solids, it will be apparent that even the slightest loss of plutonium results in a substantial reduction in the amount thereof ultimately recovered.

It is an object of the present invention to provide a method for the removal of the aforesaid condition responsible for rendering plutonium non-carriable.

It is a further object of this invention to provide a method for the pretreatment of plutonium-containing solutions in which no soluble complex is present, but in which the plutonium is in the hexavalent state.

Other objects of this invention will be apparent as the description proceeds.

It has now been discovered that the difficulties arising from the formation of the above-mentioned complex can be avoided, thereby substantially increasing the amount of plutonium recoverable from a given solution. This object is accomplished by introducing nitrogen dioxide or oxides of nitrogen into a nitric acid solution of neutron irradiated uranium, preferably at elevated temperature, such as for example 50° to 85° C., prior to any attempted removal of plutonium therefrom by the use of a carrier. As a result of introducing the aforesaid nitrogen oxides into the uranyl nitrate solution, the complex contained therein is destroyed thereby rendering the plutonium in a form in which it is readily carriable. The resulting solution can then be treated to concentrate the plutonium contained therein in accordance with known carrier methods referred to above. By this procedure, plutonium can be recovered in amounts which represent 95%, and above, of the total quantities of plutonium originally present, whereas if the removal of the plutonium from such solutions is attempted without taking any previous measures to reduce the soluble complex content thereof, it will be found that the plutonium is recoverable in amounts of the order of only about 45%.

While the oxides of nitrogen generated by dissolving neutron irradiated uranium or similar metal in nitric acid serve to destroy the complex present in solutions of the type discussed, it is not believed that all of such gases are active to effect the decomposition thereof. It is known, however, that nitric oxide, per se, can be employed to obtain the same results as those procured when using a mixture of nitrogen oxides such as those generated by dissolving a suitable metal in nitric acid. In connection with the utilization of the aforesaid nitrogen oxides, it should be pointed out that the stack gases generated by dissolving large quantities of neutron irradiated uranium in nitric acid, as is practiced at present, serve as an excellent source of the oxides to bring about the above mentioned results.

It should likewise be pointed out that nitrogen dioxide, or the above-mentioned mixtures of nitrogen oxides, may also be employed in the treatment of plutonium-containing solutions in which no soluble complex is present or, otherwise stated, in solutions other than those prepared by solution of neutron irradiated uranium in nitric acid. As previously mentioned, hexavalent plutonium is not carriable by carriers of the type of lanthanum fluoride and prior to the removal thereof by carrier methods of this type must be reduced to the tetravalent state. To achieve this object nitrogen dioxide, or the aforesaid nitrogen oxide mixtures, may be employed with highly satisfactory results. It will therefore be apparent that the use of nitrogen oxides to render plutonium in a carriable state in accordance with the present invention is applicable either to plutonium-containing solutions in which the aforesaid complex is present or solutions having no complex but containing plutonium in the hexavalent state.

The process of the present invention may be further illustrated by the following specific example:

Example I

Neutron irradiated uranium is dissolved in boiling nitric acid of 60% strength under a reflux condenser using 5.0–5.5 moles of nitric acid per mole of uranium. The solution is then divided into two parts and diluted until the uranyl nitrate concentration is 10%. The nitric acid concentration, as a result, is about 1 N. Next, a lanthanum fluoride carrier precipitation is made from half of the solution. Oxides of nitrogen generated by the solution of uranium or other active metal, in nitric acid are then passed through the other portion of the solution for about two hours at 75° C. after which a lanthanum fluoride carrier is precipitated therein and then removed. In the untreated portion of the solution only 43% of the plutonium present is found to be carried by the lanthanum fluoride whereas in the treated portion 95% of the plutonium present is carried.

Example II

In accordance with this example, slugs of neutron irradiated uranium were dissolved in nitric acid accompanied by heating. In other words a uranyl nitrate hexahydrate solution was prepared in a manner similar to that described under Example I. This solution was diluted to about 20% uranyl nitrate hexahydrate. Oxides of nitrogen were externally generated from a mixture of formic acid and nitric acid reacted together. Other ways of externally generating or obtaining sources of oxides of nitrogen may be employed, the foregoing being merely illustrative.

These externally generated gases were passed through the aforementioned uranyl nitrate hexahydrate solution. At the end of approximately 15 minutes, tests indicated that the treatment was proceeding satisfactorily in that at least two-thirds of any Pu in the +6 valence state had been reduced to the +4 valence state. By continuing the treatment for a further interval substantially complete reduction was accomplished. Thereafter, as in Example I, the Pu in the reduced condition was precipitated by means of a carrier precipitate. By means of alpha counts on the supernatant solution remaining, it appeared that substantially complete recovery of the Pu had been accomplished thereby also indicating that any complexes of the plutonium initially present had been eliminated by the herein-described treatment.

Example III

A uranyl nitrate hexahydrate solution was prepared in a manner similar to that of the preceding examples by dissolving irradiated U in nitric acid. The resultant solution was diluted to approximately 40% uranyl nitrate hexahydrate by the addition of water.

As a source of oxides of nitrogen in this example, the evolved gases generated from a conventional laboratory dissolver in which irradiated uranium metal was undergoing dissolution were employed. That is, the evolved gases from the aforementioned dissolution procedure were bubbled through the 40% uranyl nitrate hexahydrate solution. At the end of approximately 15 minutes, tests indicated that all of the Pu in a higher valence had been reduced to a lower valence. That is, the solution indicated complete reduction. It is apparent from this example that the so-called stack gases, which heretofore have been regarded as waste gases from dissolving, may be employed for the useful purpose of treating plutonium-containing solutions and eliminating complexes in the manner as described. In the last-mentioned examples the treatment with the oxides of nitrogen was also accompanied by heating the solution being treated within a temperature range slightly above room temperature to about 85° C.

It will be apparent that the process of this invention is susceptible of numerous improvements and modification without departing from the spirit thereof. In general, it may be said that any process for the treatment of plutonium-containing solutions with oxides of nitrogen prior to the removal of plutonium therefrom is to be considered as lying within the scope of the present invention.

I claim:

1. In a process for the recovery of plutonium by means of carrier precipitation of tetravalent plutonium from an aqueous solution prepared by dissolving neutron irradiated uranium in nitric acid, the step which comprises introducing into said solution, after dissolution of said neutron-irradiated uranium and prior to the removal of the plutonium by said carrier precipitation, a gas comprising an oxide of nitrogen chosen from the group consisting of nitric oxide and nitrogen dioxide.

2. In a process for treating an aqueous plutonium solution containing hydrazine, the improvement step of decomposing hydrazine and hydrazine complex of plutonium consequently present in the said solution a gas from comprises introducing into the said solution a gas from an external source comprising an oxide of nitrogen chosen from the group consisting of nitric oxide and nitrogen dioxide.

3. In the chemical processing of plutonium contained in an aqueous solution wherein at least a fraction of the plutonium is in the hexavalent state, the step of effecting reduction of plutonium therein from the hexavalent state to the tetravalent state which comprises introducing into the said solution a gas from an external source comprising an oxide of nitrogen chosen from the group consisting of nitric oxide and nitrogen dioxide.

4. In a process for treating an aqueous plutonium solution which has been prepared by dissolution of neutron-irradiated uranium in nitric acid, the step of decomposing hydrazine and hydrazine complex of plutonium consequently present in the said solution and contemporaneously effecting reduction of plutonium from the hexavalent state to the tetravalent state which comprises introducing into the said solution subsequent to the dissolution step a gas comprising an oxide of nitrogen chosen from the group consisting of nitric oxide and nitrogen dioxide.

5. In a process for the recovery of plutonium by means of carrier precipitation of tetravalent plutonium from an aqueous solution wherein at least a fraction of the plutonium is in the hexavalent state, and which contains hydrazine, the step which comprises introducing into the said solution, prior to the removal of plutonium by said carrier precipitation, gases generated by the dissolution of uranium in nitric acid said gases being introduced from an external source and containing an oxide of nitrogen selected from the group consisting of nitric oxide and nitrogen dioxide.

6. In a process for the recovery of plutonium by means of carrier precipitation of tetravalent plutonium from an aqueous solution prepared by dissolution of neutron-irradiated uranium in nitric acid, the step of decomposing hydrazine and hydrazine complex of plutonium consequently obtaining in the said solution and contemporaneously effecting reduction of plutonium from the hexavalent state to the tetravalent state, which comprises reintroducing into the said solution, prior to the removal of the plutonium by said carrier precipitation, at least a portion of the evolved gas generated by the said acid dissolution, said gas containing an oxide of nitrogen selected from the group consisting of nitric oxide and nitrogen dioxide.

7. The process of claim 1, wherein said gas comprises nitric oxide.

8. The process of claim 1, wherein said gas comprises nitrogen dioxide.

References Cited in the file of this patent

UNITED STATES PATENTS 2,785,951     Thompson et al.   -------- Mar. 19, 1957

OTHER REFERENCES

Mellor: "Inorganic and Theoretical Chemistry," vol. 8, page 315 (1928), publ. by Longmans, Green & Co., London.

Mellor: "Modern Inorganic Chemistry," pages 409, 410 (1939), publ. by Longmans, Green & Co., London.